United States Patent [19]

Iizuka et al.

[11] 3,930,137

[45] Dec. 30, 1975

[54] METHOD AND APPARATUS FOR FILLETT WELDING LONGITUDINAL MEMBERS OF FRAMED STRUCTURES

[75] Inventors: Shimpei Iizuka; Katsumi Ishimoto, both of Yokosuka, Japan

[73] Assignee: Sumitomo Shipbuilding & Machinery Co., Ltd., Tokyo, Japan

[22] Filed: July 3, 1974

[21] Appl. No.: 485,492

[30] Foreign Application Priority Data

July 4, 1973 Japan.............................. 48-74888
July 4, 1973 Japan.............................. 48-74889
Oct. 16, 1973 Japan.............................. 48-115279

[52] U.S. Cl................ 219/125 R; 219/124; 228/32; 228/45
[51] Int. Cl.²........................................... B23K 9/12
[58] Field of Search............ 219/60 R, 78, 118, 124, 219/125 R, 125 PL; 228/28, 32, 45

[56] References Cited
UNITED STATES PATENTS

| 1,965,331 | 7/1934 | Chapman...................... 219/125 R |
| 2,439,740 | 4/1948 | Johnson......................... 219/125 R |
| 3,111,575 | 11/1963 | Thompson et al................... 219/78 |
| 3,437,787 | 4/1969 | Chyle........................... 219/124 X |
| 3,452,180 | 6/1969 | Bollinger et al................. 219/125 R |
| 3,527,918 | 9/1970 | Fielder et al.................... 219/125 R |
| 3,643,050 | 2/1972 | Carter............................ 219/124 X |
| 3,697,720 | 10/1972 | Christopher................... 219/60 R X |
| 3,764,777 | 10/1973 | Sakabe et al..................... 219/125 R |

FOREIGN PATENTS OR APPLICATIONS

46,034  3/1966  Germany...................... 219 125 R/

*Primary Examiner*—C. L. Albritton
*Assistant Examiner*—N. D. Herkamp
*Attorney, Agent, or Firm*—Armstrong, Nikaido & Wegner

[57] ABSTRACT

A method and apparatus are provided for fillet welding a plurality of longitudinal members of a framed structure comprising a horizontal plate, a plurality of transverse members joined to said horizontal plate in equidistantly spaced apart relation and in parallel with each other and said longitudinal members intersecting said transverse members and joined to said horizontal plate in equidistantly spaced apart relation and in parallel with each other, in which a small opening is formed through the transverse members at every intersection with the longitudinal members, and a welding apparatus which may pass through these small openings is advanced along the longitudinal member to be welded to the horizontal plate so that the longitudinal member may be welded continuously to the horizontal plate over its whole length from one end to the other only by one traverse of the welding apparatus.

12 Claims, 16 Drawing Figures

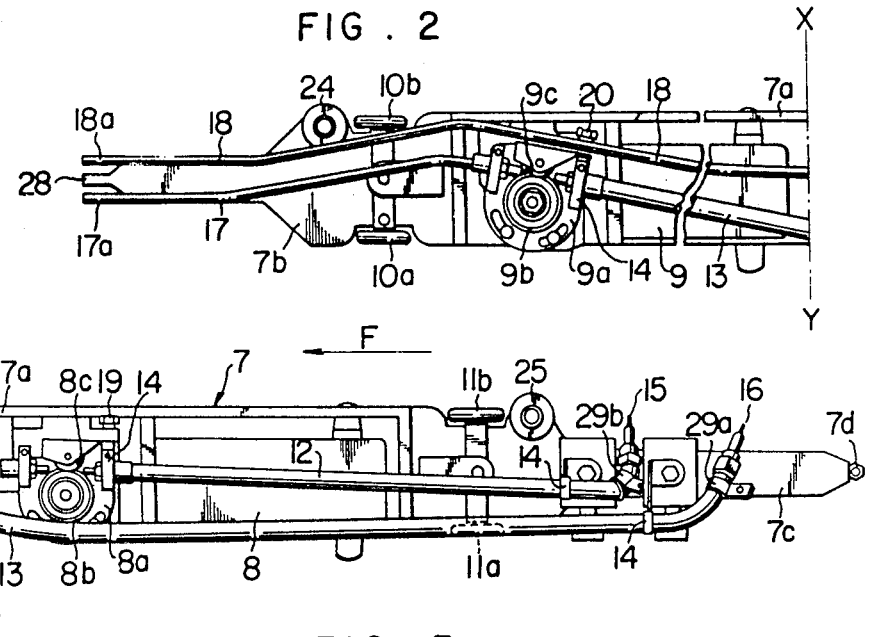
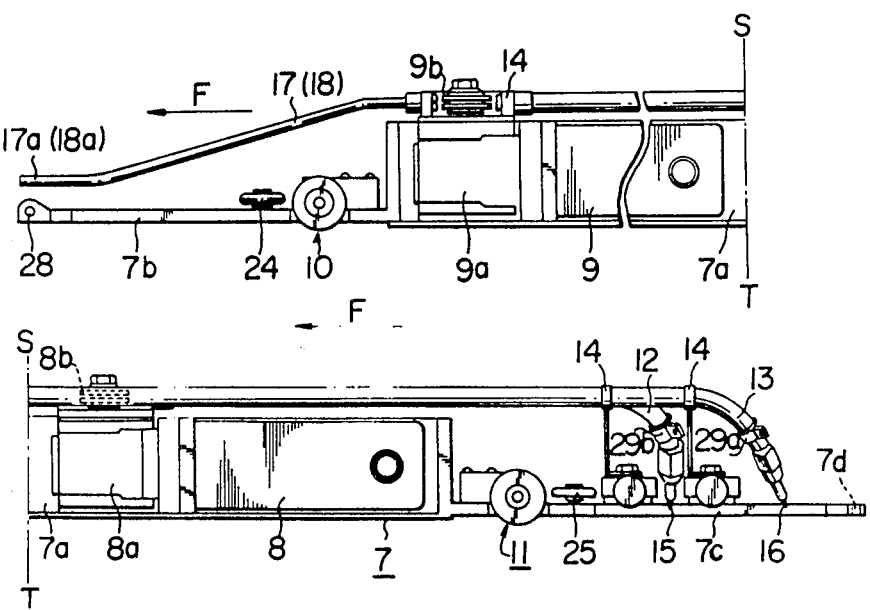

METHOD AND APPARATUS FOR FILLETT WELDING LONGITUDINAL MEMBERS OF FRAMED STRUCTURES

BACKGROUND OF THE INVENTION

The present invention relates to a method and apparatus for continuously fillet welding a plurality of longitudinal members to a horizontal plate so as to assemble a framed structure or substructure consisting of the horizontal plate, a plurality of transverse members joined thereto in equidistantly spaced apart relation in parallel with each other and a plurality of longitudinal members joined to the horizontal plate in equidistantly spaced apart relation and in parallel with each other, intersecting the transverse members.

According to the conventional method for assemblying the framed structures or substructures of the type described, after the transverse members and the longitudinal members are arranged in parallel crosses with each longitudinal member extending through a row of mating slits formed in transverse members, they are placed upon the horizontal plate and the lower edges of each member are joined to the horizontal plate by fillet welding, the transverse member being welded manually while the longitudinal member being welded mechanically by a suitable welding machine, such as self-propelled automatic welding machine. In general, each side of the lower portion of each mating slit of the transverse member is enlarged to provide the so-called scallop-shaped hole which is usually formed in a fan shape having a radius of the order of 100 to 150 mm measured from the intersection between the horizontal plate and the longitudinal member, in order to facilitate the welding between the longitudinal member and the horizontal plate at the intersection between the longitudinal and transverse members. However, the conventional automatic welding machine cannot advance over the transverse members so that whenever it hits them, the welding operation must be stopped. In other words, it is impossible for the conventional automatic welding machine to continuously weld the longitudinal member to the horizontal plate from one end to the other end thereof. Therefore, the welding operations must be cycled many times to join each longitudinal member to the horizontal plate so that the assembly of the framed structures or substructures of the type described is very complex and time-consuming.

SUMMARY OF THE INVENTION

One of the objects of the present invention is therefore to provide a method for continuously joining a longitudinal member of a framed structure or substructure of the type described to a horizontal plate from one end to the other end of the longitudinal member by using a welding apparatus of the type capable of passing through the scallop holes or small openings formed through the transverse members at their intersections with the longitudinal members.

According to one aspect of the present invention, a wheeled welding apparatus including at least one welding torch is pulled by a chain along one side surface of a longitudinal member to be welded to a horizontal plate continuously from one end to the other end of the longitudinal member, passing through the scallop holes of the transverse members, so that one lower edge of the longitudinal member is joined to the horizontal plate by fillet welding.

Another object of the present invention is to provide a welding apparatus best adapted to carry out the method of the present invention.

Briefly stating, a welding apparatus in accordance with the present invention comprises an elongated carriage including at least two wheel assemblies each including a pair of wheels which may be turned to one direction at an angle relative to the longitudinal axis of said carriage and may be held in said turned position; at least one welding torch mounted upon said carriage; means mounted upon said carriage for feeding an electrode wire to said welding torch; a motor mounted upon said carriage for driving said electrode wire feeding means; feed cables electrically connected to said welding torch and to said motor for energizing them; a chain whose one end is coupled to the leading end of said carriage and which is extended forwardly of said carriage along the extension of the longitudinal axis thereof; a drum disposed adjacent to one side of said horizontal plate for winding said chain thereover; and a prime mover for rotating said drum.

According to another aspect of the present invention, a carriage which is similar in construction to that of the welding apparatus and upon which is mounted a flux dispensing device is coupled to the welding apparatus in tandem so that the full-automatic welding may be carried out.

According to a further aspect of the present invention, there is provided a device for feeding the electrode wire to the welding torch through an electrically insulated flexible guide tube, the electrode wire being inserted into the guide tube at one end of the longitudinal member to be welded, so that the safety in welding operation may be ensured.

The above and other objects, features and advantages of the present invention will become more apparent from the following description of preferred embodiments thereof taken in conjunction with the accompanying drawings.

BRIEF DESCRIPTION OF THE DRAWING

FIG. 2 is a top view of a first embodiment of a welding apparatus best adapted to carry out the method of the present invention;

FIG. 3 is a side view thereof;

DESCRIPTION OF THE PREFERRED EMBODIMENTS

Figure 1:
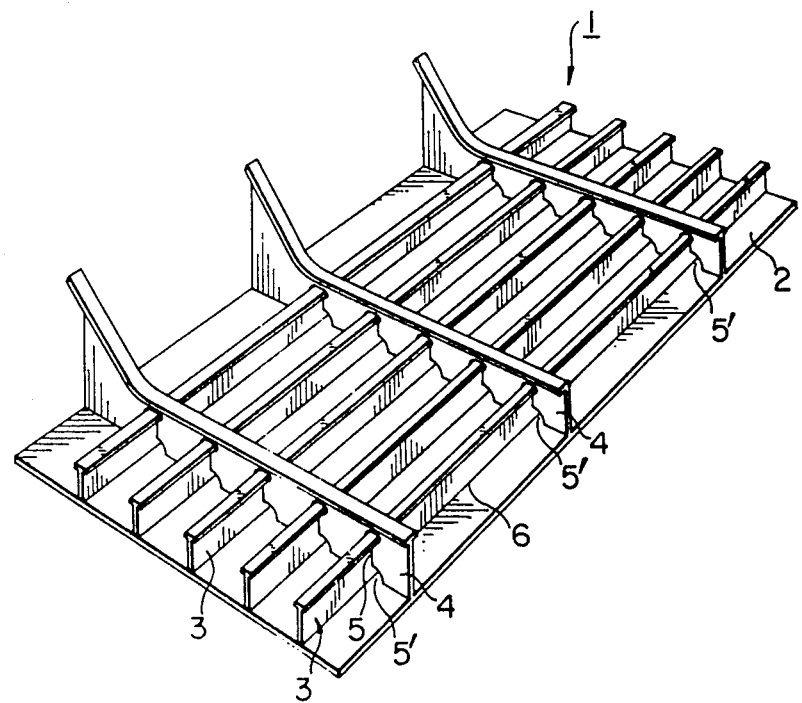
FIG. 1 is a persepective view of a framed structure or substructure to be assembled by the method and apparatus in accordance with the present invention.

FIG. 1 shows a framed structure 1, such as side plating substructure of a ship hull to which the method and apparatus in accordance with the present invention is applied. The framed structure 1 comprises a horizontal plate 2, a plurality of longitudinal members 2, and a plurality of transverse members 4 intersecting the longitudinal members 3 at right angles. In assembly of the framed structure 1, the transverse members 4 and the longitudinal members 3 are arranged upon the horizontal plate 2 in parallel crosses with each longitudinal member 3 extending through a row of slits 5 provided on the transverse members 4. Each transverse member 4 is fillet welded to the horizontal plate 2 in a manual manner while each longitudinal member 3 is fillet welded to the horizontal plate 2 by a suitable welding machine. In order to facilitate the fillet welding of the longitudinal members at intersections between the transverse and longitudinal members 4 and 3, each side of the lower portion of each slit 5 is enlarged or diverged in the form of a scallop as indicated by 5'. The radius of the scallop-shaped hole is of the order of 100 to 150 mm measured from the intersection between the horizontal plate 2 and the longitudinal member 3. However when the conventional self-propelled automatic welding machine is used, its advancement is interrupted at every transverse member 4 so that the intersections between the transverse and longitudinal members 3 and 4 cannot be welded. In view of the above, the present invention has for its object to provide a method and apparatus capable of fillet welding continuously over the whole length of the longitudinal members including their intersections with the transverse members.

First Embodiment, FIGS. 2 – 8

First referring to FIGS. 2 and 3, the first embodiment of the present invention will be described hereinafter. A carriage generally indicated by 7 and in the form of an extremely elongated structure comprises a chassis 7a having a leading plate portion 7b formed integral therewith at its leading end (the left end in the figures) and a trailing plate portion 7c formed integral therewith at its trailing end (the right end in FIGS. 2 and 3), a front wheel assembly 10 including a pair of front wheels 10a and 10b and a rear wheel assembly 11 including a pair of rear wheels 11a and 11b. The construction of the front and rear wheel assemblies 10 and 11 will be described in more detail hereinafter.

Upon the chassis 7a are mounted two elongated feed motors 8 and 9 in the longitudinal direction of the carriage 7. The first feed motor 8 drives through a reduction gear 8a a feed roller 8b while the second feed motor 9 drives a feed roller 9b through a reduction gear 9a. The first and second feed rollers have the grooves or notches at their peripheries and coact with pressure rollers 8c and 9c, respectively, so as to feed electrode wires as will be described in more detail hereinafter.

Upon the chassis 7a are also mounted a first and second welding torches or electrode holders 12 and 13 which are securely held in position by means of two supporting members 14 disposed close to the feed rollers 8b and 9b and at the rear portion of the chassis 7a. The first and second welding torches 12 and 13 comprise a copper tube which is electrically insulated except the leading portions and the coupling sections 29a and 29b at which the electrode torches 12 and 13 are connected to the cables leading to a power source. In like manner first and second electrically insulated guide tubes 17 and 18 are mounted upon the chassis 7a between the feed rollers 8b and 9b and the leading end in such a way that the openings of the guide tubes 17 and 18 on the side of the feed rollers 8b and 9b may be in opposed relation with the openings of the welding torches 12 and 13, respectively, across the feed rollers 8b and 9b as best shown in FIG. 2. In operation, the electrode wires 15 and 16 are fed through the first and second guide tubes 17 and 18 respectively and further fed into the welding torches 12 and 13 by the feed rollers 8b and 9b and the pressure rollers 8c and 9c, respectively. In order to adjust the pressure under which the electrode wires 15 and 16 are pressed against the feed rollers 8b and 9b, pressure adjusting devices 19 and 20 of the type in which the forces of a spring is adjusted by loosening or tightening an adjusting screw are attached to the pressure rollers 8c and 9c, respectively, as best shown in FIG. 2. The welding current is supplied to the electrode wires 15 and 16 in the welding torches 12 and 13 from the power source through the cables (not shown) connected to the exposed connecting sections 29a and 29b of the welding torches 12 and 13. The cables (not shown) are so arranged as to be unwound from a reel 21 (see FIG. 8) as the welding machine carriage 7 is advanced in the direction indicated by the arrow F in operation as will be described in more detail hereinafter.

Figure 4:
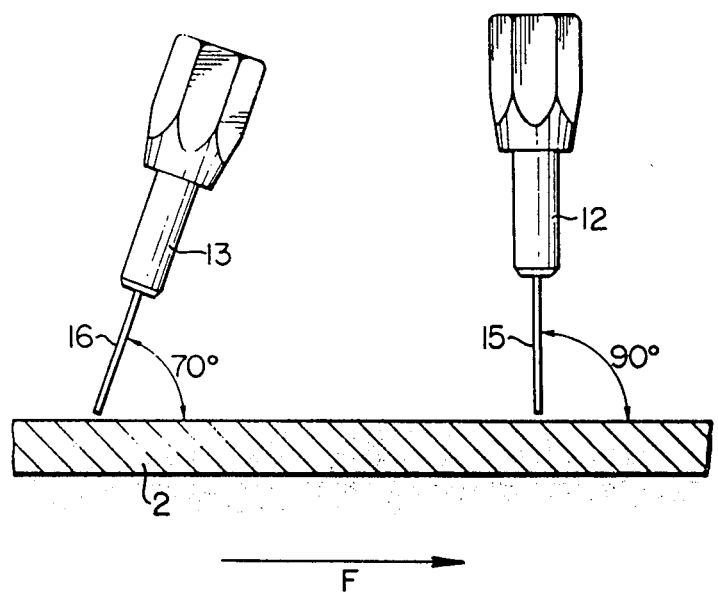
FIGS. 4 and 5 are side and front views of welding torches illustrating the angular positions of the electrode wires extending therefrom relative to the longitudinal member and the horizontal plate.
Figure 5:
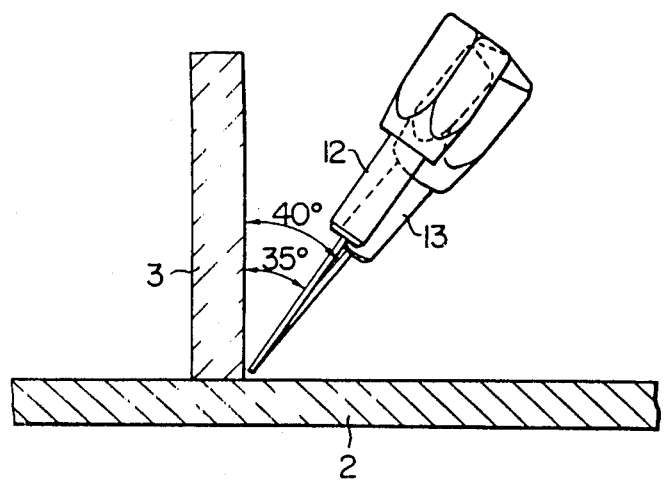

As shown in FIG. 4, the leading tip portion of the electrode wire 15 fed through the first welding torch 12 is generally held at a right angle relative to the axis of the longitudinal member 2 while the leading tip portion of the electrode wire 16 fed through the second welding torch 13, at an angle of 70°. As shown in FIG. 5, these leading tip portions of the electrode wires 15 and 16 are inclined at 35°, respectively, relative to the vertical side surface of the longitudinal member 3.

Figure 6A:
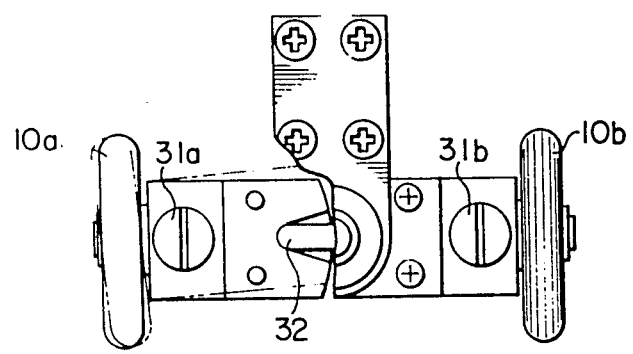
FIGS. 6A and 6B are top views of a wheel assembly of the welding apparatus shown in FIGS. 2 and 3.
Figure 6B:
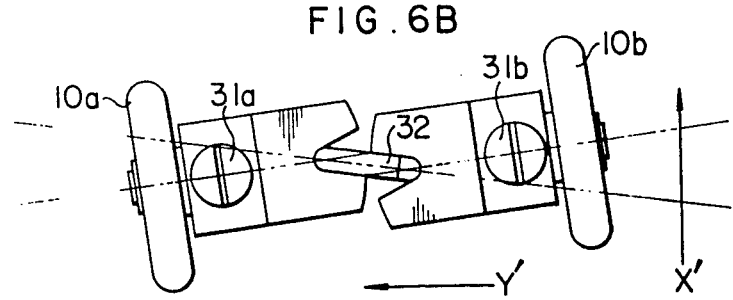
Figure 7:
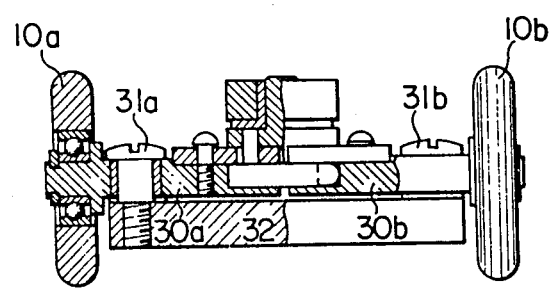
FIG. 7 is a side view, partly in section, N of the welding apparatus shown in FIGS. 2 and 3.

Next referring to FIGS. 6 and 7, the front and rear wheel assemblies 10 and 11 will be described. Since they are substantially similar in construction, it will surface to describe only the front wheel assembly 10. According to one of the features of the present invention, the wheels 10a and 10b are turned to one direction at an angle relative to the direction of the advancement of the carriage 7 as best shown in FIG. 6B so that the carriage 7 may advance exactly along the longitudinal member 3 to be welded. For this purpose, the wheels 10a and 10b are rotatably mounted on individual axles 30a and 30b, respectively, which are pivoted by pivot or king pins 31a and 31b, respectively, and are interconnected by a snap spring 32 so that the wheels 10a and 10b are forced to turn in the same direction as best shown in FIG. 6B. More particularly, when the wheel 10a is turned to the opposite direction from the position shown in FIG. 6B, the other wheel 10b is forced to turn in the same opposite direction through the same angle. Therefore when the carriage 7 is drawn or advanced in the direction indicated by the arrow X', a transverse force is exerted to the carriage 7 in the direction indicatd by the arrow 7' in FIG. 6B.

Referring back to FIGS. 2 and 3, horizontal guide rollers 24 and 25 are attached to the leading and trailing plate portions 7b and 7c, respectively of the carriage 7 on the same side with the leading ends of the electrode wires 15 and 16. The guide rollers 24 and 25 are pressed against the side surface of the longitudinal member 3 to be welded under the lateral or transverse force produced as the front and rear wheels 10 and 11 are kept turned toward the longitudinal member 3 as described hereinbefore so that the carriage 7 may be drawn or advanced along the longitudinal member 3 and spaced apart therefrom by a predetermined distance. Thus, as shown in FIGS. 4 and 5 the tips of the electrodes wires 15 and 16 may be guided along a predetermined welding line while the electrode wires 15 and 16 are held in predetermined angular positions respectively.

Figure 8:
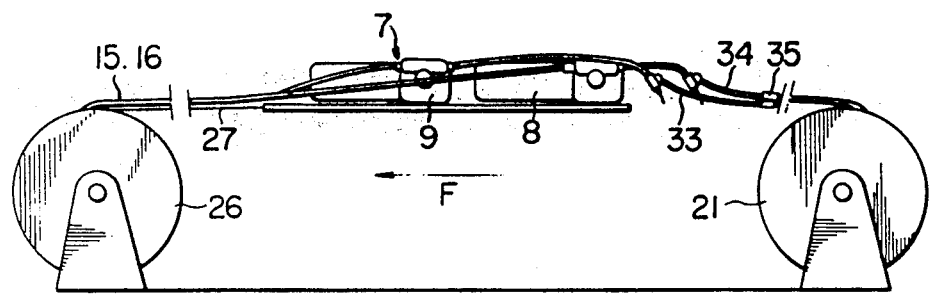
FIG. 8 is a view used for the explanation of the welding method of the present invention using the welding apparatus shown in FIGS. 2 and 3.

Next referring to FIG. 8, the mode of operation will be described. Assuming that the carriage 7 is located at the starting position at one end of the longitudinal member 3, the leading end of a chain 27 unwound from a drum 26 is extended through the scallop holes 5' of the transverse members 4 along the longitudinal member 3 to be welded, and joined with a pin to a coupling member 28 (See FIGS. 2 and 3) at the leading end of the leading plate portions 7b of the carriage 7. The two electrode wires 15 and 16 unwound from an electrode wire supply drum (not shown) disposed adjacent to the drum 26 are also extended through the scallop holes 5' of the transverse members 4, inserted into the guide tubes 17 and 18 from its openings 17a and 18a (See FIGS. 2 and 3), and extended through the guide tubes 17 and 18 and the welding torches 12 and 13 after passing through the feed rollers 8b and 9b and the pressure rollers 8c and 9c in such a way that the leading ends or tips of the electrode wires 15 and 16 may be slightly extended out of the welding torches 13 and 14, respectively. The feed cables 33 and 34 are electrically connected to the exposed connecting sections 29a and 29b of the welding torches 12 and 13. The feed cables 33 and 34 are bundled together near the rear end of the trailing plate position 7c and detachably connected through a connector 35 to the cables unwound from the reel 21 disposed on the opposite side of the drum 26. Even though not shown for the purpose of simplicity, the feed cables are also connected to the feed motors 8 and 9 in a manner substantially similar to that described above.

In operation the electric currents are supplied to the feed motors 8 and 9 and to the welding torches 12 and 13 while the drum 26 is driven by an electric motor (not shown) so that the chain 27 is wound around the drum to draw the carriage 7 along the longitudinal member 3 at a constant speed in the direction indicated by the arrow F. Therefore the lower side edge of the longitudinal member 3 is continuously fillet welded to the horizontal plate 2. Since the retardation force is applied to the carriage 7 from the reel 21 through the feed cables, the smooth travel of the carriage 7 may be ensured. As described in detail hereinbefore, the welding apparatus in accordance with the present invention is of an extremely elongated structure to permit it to pass through the scallop holes 5' with sufficient clearance so that the longitudinal member 3 may be completely welded to the horizontal plate 2 along its whole length from one end to the other by one traverse of the welding carriage or apparatus.

After the carriage 7 traverses the horizontal plate 2 and passes its side by a predetermined distance, the drum 26 is stopped to stop the carriage. Thereafter, the feed cables are disconnected at 35 from those extended from the feed cable reel 21 so that the feed cables may be wound around the reel 21. Thereafter the horizontal plate 2 is fed transversely over a distance equal to the pitch of the longitudinal members 3, and then a steel strip is unwound from a drum (not shown) disposed adjacent to the feed cable reel 21, and extended through the scallop holes 5' of the transverse members 4 along the next longitudinal member 3 to be welded so that a hook at the leading end of the steel strip may be hooked to the eye 7d at the trailing end of the carriage. The steel strip may be provided at its forward end with two or more guide rollers adapted to roll on the horizontal plate 2 so as to ensure the smooth movement of the strip (not shown). The wheels 10a, 10b, 11a, and 11b are turned to the opposite direction, and the steel strip is rewound so that the carriage 7 may be returned to one side of the horizontal plate 2 along the longitudinal member 3 passing through the scallop holes 5' of the transverse members 4. Thereafter the steel strip is detached from the carriage, and the cables unwound from the cable reel 21 are connected to the feed cables 33 and 34 and the feed cables (not shown) of the feed motors 8 and 9 at 35. Thus the next welding operation may be started again in a manner substantially similar to that described hereinbefore.

SECOND EMBODIMENT, FIGS. 9 – 11

Figure 9:
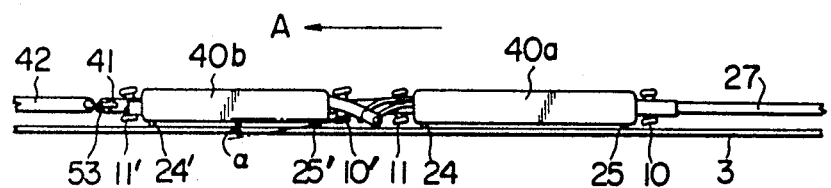
FIG. 9 is a top view of a second embodiment of the present invention showing the apparatus moving toward a welding starting position.
Figure 10:
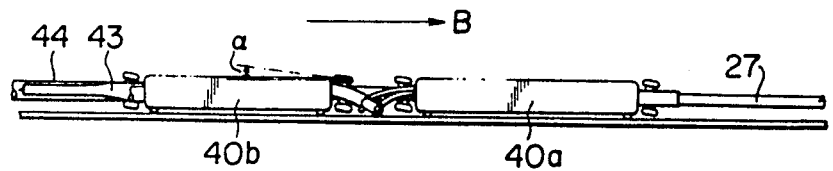
FIG. 10 is a top view thereof showing the apparatus during welding operation.

As shown in FIGS. 9 and 10, the second embodiment is different from the first embodiment in that the welding machine carriage is coupled to an automatic flux dispenser so that the full-automatic welding may be accomplished. The carriage of the flux dispenser 40b is substantially similar in construction to the carriage of the welding machine 7 or 40a in FIGS. 9 and 10. It has the front and rear wheel assemblies 10' and 11' and two horizontal guide rollers 24' and 25'. The chain 27 is coupled to the welding machine carriage 40a and the flux dispenser carriage 40b, and its leading end portion is slightly extended from the trailing end of the flux dispenser carriage 40b. When the welding machine carriage 40a is returned to its new starting position, a hook 53 at the leading end of the steel strip 42 is hooked to an eye 41 at the leading end of the chain 27. Reference numeral 43 denotes the cable for feeding the currents to the electric torches and the feed motors; and 44, a suction hose for recovering the unused flux. When the carriages 40a and 40b are returned to the starting position in the direction indicated by the arrow A' and they are advanced for welding operation in the direction indicated by the arrow B, their front and rear wheel assemblies 10, and 10'; and 11 and 11' are turned through an angle α toward the longitudinal member 3 because of the reasons described hereinbefore.

Figure 11:
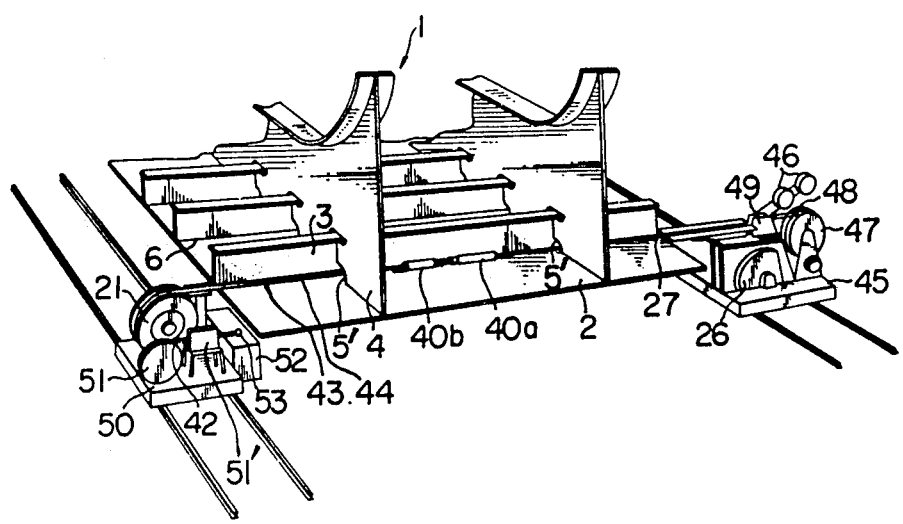
FIG. 11 is a perspective view used for the explanation of the welding method of the present invention using the second embodiment shown in FIGS. 9 and 10.

FIG. 11 shows the mode of operation of the second embodiment. In welding step, the chain 27 is wound around the drum 26 mounted upon a carriage 45 riding on the rails so that the welding machine carriage 40a and the flux dispenser carriage 40b are pulled from the left to the right in FIG. 11 while the electrode wires 15 and 16 unwound from the electrode wire drums 46 are fed into the welding torches on the welding machine carriage 40a in the direction opposite to the direction of the advancement of the carriage 40a in a manner substantially similar to that described hereinbefore. Upon the carriage 45 are also mounted an insulated guide tube winding drum 47 and a device 49 adapted to insert the electrode wires 15 and 16 into the guide tubes 48 in a manner to be described in more detail hereinafter. Upon a carriage 50 riding on the rails laid on the opposite side of the carriage 45 are mounted the cable reel 21, a steel strip winding drum 51, a steel strip driving mechanism 51', and a flux recovering device 52. In the welding step, the feed cable and the suction hose for recovering the unused flux are unwound from the reel 21.

After the welding step, the cable and the suction hose are disconnected from the carriage 40a and 40b, respectively, and are wound around the reel 21. Thereafter, instead of feeding the substructure 1, the carriages 45 and 50 are moved on the rails over a distance equal to one pitch of the longitudinal members 3. The steel strip 42 is unwounded from the drum 51 under the action of the driving mechanism 51' comprising feed rollers driven by a motor and extended through the scallop holes 5' of the transverse members 4 along the next longitudinal member 3 to be welded so that the hook 53 at the leading end of the steel strip 42 may be engaged with the eye 41 of the chain 27. Thereafter the driving mechanism 51' is reversely driven and the steel strip 42 is rewound around the drum 51 so that the carriages 40a and 40b are returned to the initial or welding starting position on the side of the carriage 50 while the electrode wires 15 and 16 supplied from the drums 46 are inserted into the guide tubes 48 unwound from the drum 47 on the carriage 45.

Electrode Wire Inserting and Separating Device, FIGS. 12, 13, 14, and 15

Next referring to FIGS. 12 – 15, the electrode wire inserting and separating device 49 will be described in more detail hereinafter. The chain 27 which is provided with a plurality of tube clamps 55 spaced apart equidistantly from each other in the axial direction is directed downwardly by a sprocket wheel 54 immediately before the chain 27 is wound around the drum 26 (see FIGS. 8 and 11). Each clamp 55 has arcuate legs adapted to clamp therebetween the flexible guide tube 48 so that the latter may be transported in unison with the chain 27. A separating line 56 is formed at the top of the guide tube over the whole length thereof. A roller 57 is disposed immediately above the sprocket wheel 54 in opposed relation therewith so that the guide tube 48 may be guided. The electrode wire 15 supplied from the drum 46 (see FIG. 11) passes through an electrode wire inserting device 58 and is inserted into the insulated guide tube 48.

Figure 13:
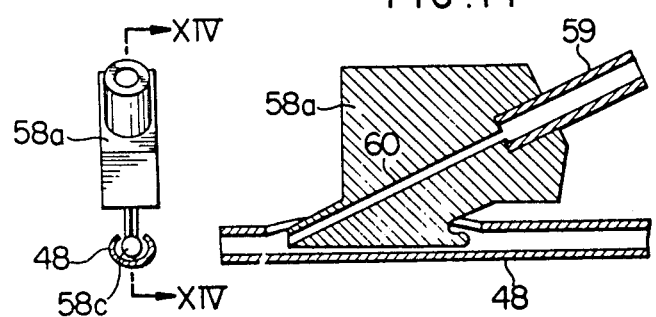
FIG. 13 is a side view of the device of FIG. 12.
Figure 14:
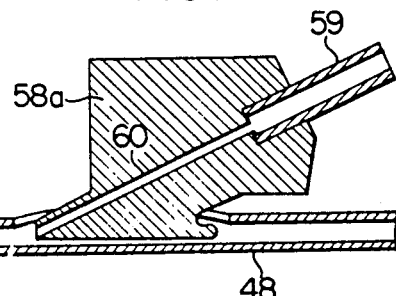
FIG. 14 is a cross sectional view taken along a line XIV — XIV of FIG. 13.
Figure 15:
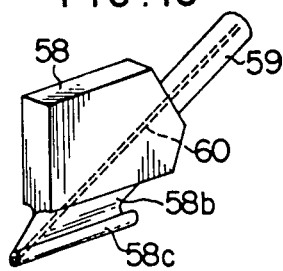
FIG. 15 is a perspective view of the device of FIG. 14. Same reference numerals are used to denote similar parts throughout the figures.

The electrode wire inserting device 58 is shown in detail in FIGS. 13 - 15. The main body 58a is generally rectangular in cross section, and has a tubular guide rod 58c suspended through a thin-wall supporting member 58b from the lower bottom of the main body 58a. A guide tube 59 is attached to the main body 58a at an angle relative to the vertical, and within the main body 58a and the supporting plate 58b is formed a guide passage 60 interconnecting between the guide tube 59 and the tubular guide rod 58c. The tubular guide rod 58c is inserted into the guide tube 48 through the separating line 56 and coacts with a supporting roller 61 disposed immediately below the rod 58c so that the insulated guide tube 48 may be guided.

Figure 12:
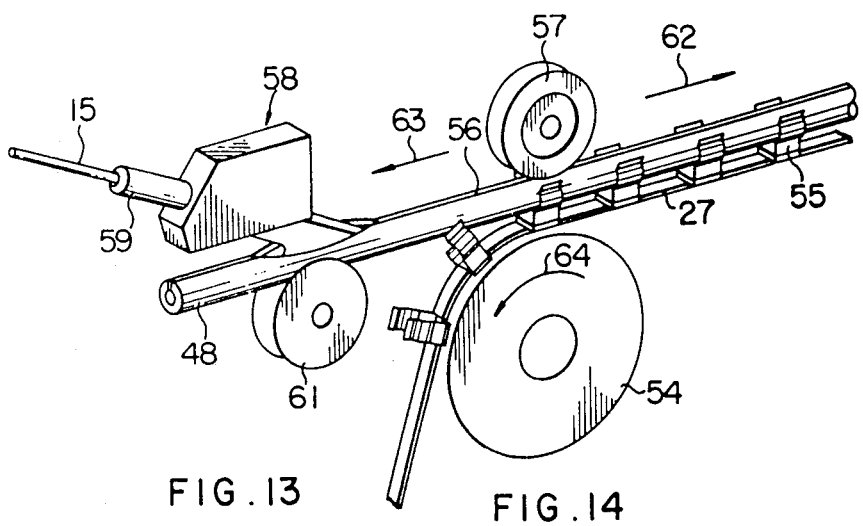
FIG. 12 is an electrode wire inserting and separating device used in conjunction with the welding apparatus of the present invention.

When the chain 27 is pulled in the direction indicated by 62 in FIG. 12 so as to return the carriages 40a and 40b to the welding starting position, the insulated guide tube 48 unwound from the drum 47 (See FIG. 11) is clamped by the clamps 55 of the chain 27 as the insulated guide tube 48 passes between the sprocket wheel 54 and the roller 57 so that it may be transported by the chain 27 in the direction indicated by 62. The insulated guide tube 48 is partly opened along the separating line 56 because the guide rod 58c is inserted so that the electrode wire 15 supplied from the drum passes through the electrode wire inserting device 58 to be inserted into the insulated guide tube 48. The opened insulated guide tube 48 is naturally closed as it is elastic after passing through the guide rod 58c. Thus, the electrode wire 15 inserted into the insulated guide tube 48 may be transported by the chain 27 in the direction indicated by the arrow 62.

In the welding step, the chain is pulled around the sprocket wheel 54 in the direction indicated by the arrow 64 while the insulated guide tube 48 is returned in the direction indicated by the arrow 63 and is released from the clamps 55 of the chain 27 after passing through the sprocket wheel 54 and the roller 57. When the guide tube 48 is passing through the guide rod 58c, it is separated from the electrode 15 and then wound around the drum 47 while the electrodude electrode is continuously pulled in the direction indicated by the arrow 62 by the feed roller 8b and the pressure roller 8c on the carriage 7 (See FIGS. 2 and 3).

As described hereinbefore, regardless of the position of the welding machine carriage the electrode wire is fed to it through the insulated guide tube so that the safety may be ensured. Futhermore the electrode wire and the insulated electrode wire guide tube are unwound from the separate drums by a length depending upon the position of the welding machine carriage so that it is not required to provide a large space for the insulated guide tube 48.

What is claimed is:

1. In an assembly of a framed structure comprising a horizontal plate, a plurality of parallel transverse members, and a plurality of parallel longitudinal members, said transverse and longitudinal members being arranged perpendicular to each other, wherein said transverse members have a small opening formed therethrough at every corner defined by said horizontal plate and said longitudinal members so that the spaces defined by the adjacent transverse members may be intercommunicated with each other, a method for fillet welding said longitudinal members to said horizontal plate comprising the steps of a. connecting one end of a length of chain to a welding apparatus, said chain extending from one end of one of said longitudinal members to be welded to the other end thereof including passing said chain through said small openings of said transverse members, said welding apparatus comprising wheels for carrying said welding apparatus upon said horizontal plate, and at least one welding torch holding therein an electrode wire; and b. supplying the welding current to said electrode wire while said chain is pulled through said small openings so that said welding apparatus travels along one side surface of said one longitudinal member passing through said small openings of said transverse members as it moves from one end to the other end of said one longitudinal member, whereby said one longitudinal member may be continuously fillet welded to said horizontal plate.

2. A method as defined in claim 1 including turning said wheels of said welding apparatus in a direction at an angle relative to the longitudinal axis of said welding apparatus, and exerting a rear force on said welding apparatus in the direction opposite of the direction of the travel of said welding apparatus when said welding apparatus is pulled in the forward direction by said chain, whereby a transverse force tending to press said welding apparatus against said longitudinal member is produced.

3. A method as defined in claim 2 wherein exerting said rear force includes coupling an electric feed cable to said welding apparatus and applying a force to said cable in the direction opposite to that applied to said chain so that said rear force may be provided by said cable.

4. An apparatus for welding a frame structure comprising a horizontal plate, a plurality of parallel transverse members, and a plurality of parallel longitudinal members, said transverse and longitudinal members being arranged perpendicular to each other, wherein said transverse members have a small opening formed therethrough at every corner defined by said horizontal plate and said longitudinal members so that the spaces defined by the adjacent transverse members may be intercommunicated with each other, said apparatus comprising
 a. an elongated carriage including at least two wheel assemblies each including a pair of wheels which may be turned to one direction at an angle relative to the longitudinal axis of said carriage and may be held in said turned position;
 b. at least one welding torch mounted upon said carriage;
 c. means mounted upon said carriage for feeding an electrode wire to said welding torch;
 d. a motor mounted upon said carriage for driving said electrode wire feeding means;
 e. feed cables electrically connected to said welding torch and to said motor for energizing them, said feed cables passing through said small openings in said transverse members;
 f. a chain having one end coupled to the leading end of said carriage said chain extending forwardly of said carriage through said small openings in said transverse members along the extension of the longitudinal axis thereof;
 g. a drum disposed adjacent to one side of said horizontal plate for winding said chain therearound; and
 h. a prime mover for rotating said drum.

5. An apparatus as defined in claim 4 wherein said pair of wheels of each of said wheel assemblies may be turned to the other direction at an angle relative to the longitudinal axis of said carriage and may be held in this position.

6. An apparatus as defined in claim 4 wherein said motor has an elongated shape such the axis of the rotary shaft of said motor may be aligned with the longitudinal axis of said carriage.

7. An apparatus as defined in claim 4, wherein at least two rollers are attached to said carriage such that they rotatably contact one side surface of the longitudinal member to be welded.

8. An apparatus as defined in claim 7 wherein an elongated flux diapenser is coupled in tandum to said carriage; and said flux dispenser includes at least two wheel assemblies, and at least two rollers.

9. An apparatus as defined in claim 4 including an electrically insulated flexible guide tube having one end stationarily supported on said carriage, said guide tube extending forwardly of said cariage along said chain such that said electrode wire may be fed through said electrically insulated flexible guide tube by said feeding means; and said feed cables extend to the rear of said carriage and are adapted to be detachably coupled to said welding torch motor near the trailing end of said carriage.

10. An apparatus as defined in claim 9 including, a drum for winding therearound said guide tube, and a reel for winding therearound said feed cables are disposed side by side on one side of said horizontal plate; and
 means is provided for separating said electrode wire from said guide tube when the latter is rewound onto said drum and for inserting said electrode wire into said guide tube when the latter is unwound from said drum.

11. An apparatus as defined in claim 10 wherein said chain has a plurality of clamps which are attached to said chain in an equidistantly spaced apart relation in the longitudinal axis of said chain such that said clamps may detachably clamp said guide tube to said chain.

12. An apparatus as defined in claim 11 wherein said guide tube has a separating line along which said guide tube may be opened; and
 said feeding means for inserting said electrode wire into said guide tube and separating said electrode wire from said guide tube comprises
 a cylindrical guide member disposed within said tube coaxially thereof, a thin-walled supporting member attached to said cylindrical guide member and extended out of said guide tube through said separating line thereof, and an electrode wire guide passage formed through said supporting member and opened at one end of said cylindrical guide member.

* * * * *